(12) United States Patent
Tomovic et al.

(10) Patent No.: US 8,889,756 B2
(45) Date of Patent: Nov. 18, 2014

(54) PROCESS FOR PRODUCING RIGID POLYURETHANE FOAMS

(75) Inventors: Zeljko Tomovic, Lemfoerde (DE); Olaf Jacobmeier, Luebbecke (DE); Rainer Hensiek, Melle (DE); Gunnar Kampf, Stemwede-Haldem (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/257,391

(22) PCT Filed: Mar. 16, 2010

(86) PCT No.: PCT/EP2010/053392
§ 371 (c)(1),
(2), (4) Date: Sep. 19, 2011

(87) PCT Pub. No.: WO2010/106067
PCT Pub. Date: Sep. 23, 2010

(65) Prior Publication Data
US 2012/0010313 A1    Jan. 12, 2012

(30) Foreign Application Priority Data

Mar. 18, 2009 (EP) ..................................... 09155438

(51) Int. Cl.
| C08G 18/00 | (2006.01) |
| C08J 9/14 | (2006.01) |
| C08G 18/66 | (2006.01) |
| C08G 18/48 | (2006.01) |
| C08G 101/00 | (2006.01) |

(52) U.S. Cl.
CPC .............. *C08J 9/141* (2013.01); *C08G 2105/02* (2013.01); *C08G 18/6696* (2013.01); *C08J 2375/04* (2013.01); *C08J 2205/10* (2013.01); *C08G 18/482* (2013.01); *C08G 2101/0025* (2013.01)
USPC ............................. 521/174; 521/155; 521/170

(58) Field of Classification Search
USPC ............................................................ 521/174
See application file for complete search history.

(56) References Cited

U.S. PATENT DOCUMENTS

| 4,719,247 | A | * | 1/1988 | Lin et al. ................... 521/159 |
| 5,451,615 | A | * | 9/1995 | Birch ......................... 521/132 |
| 5,523,334 | A | * | 6/1996 | White et al. ............... 521/164 |
| 5,525,641 | A | * | 6/1996 | White et al. ............... 521/131 |
| 5,688,835 | A | | 11/1997 | Scherbel et al. |
| 5,886,062 | A | | 3/1999 | Dietrich et al. |
| 5,895,792 | A | * | 4/1999 | Rotermund et al. ........ 521/131 |
| 6,495,722 | B1 | | 12/2002 | Zimmerman et al. |
| 2006/0229371 | A1 | | 10/2006 | Park et al. |
| 2007/0232712 | A1 | * | 10/2007 | Emge et al. ................. 521/176 |

FOREIGN PATENT DOCUMENTS

| EP | 0 728 783 | 8/1996 |
| EP | 0 826 708 | 3/1998 |
| EP | 1 632 511 | 3/2006 |
| EP | 2 000 487 | 6/2010 |
| WO | 2004 065447 | 8/2004 |
| WO | 2006 108833 | 10/2006 |

OTHER PUBLICATIONS

U.S. Appl. No. 13/299,128, filed Nov. 27, 2011, Mohmeyer, et al.
International Search Report Issued Jun. 7, 2010 in PCT/EP10/053392 Filed Mar. 16, 2010.

* cited by examiner

*Primary Examiner* — Melissa Rioja
(74) *Attorney, Agent, or Firm* — Oblon, Spivak, McClelland, Maier & Neustadt, L.L.P.

(57) ABSTRACT

A process for producing rigid polyurethane foams, in which a mixture of
one or more high-functionality polyether alcohols having functionalities of from 3.5 to 5.5 and a hydroxyl number of from 350 to 550 mg KOH/g,
one or more polyether alcohols based on aliphatic and/or aromatic amines and having functionalities of from 3 to 4 and a hydroxyl number of from 150 to 800 mg KOH/g,
an OH-comprising fatty acid ester and, if appropriate,
one or more low molecular weight chain extenders and/or crosslinkers having functionalities of from 2 to 3 and a molecular weight $M_w$ of <400 g/mol
is used as polyol component, is described. The rigid polyurethane foams obtained have a good surface quality.

17 Claims, No Drawings

PROCESS FOR PRODUCING RIGID POLYURETHANE FOAMS

The invention relates to a process for producing rigid polyurethane foams.

Rigid polyurethane foams have been known for a long time and have been described widely. Rigid polyurethane foams are used predominantly for thermal insulation, for example in refrigeration appliances, transport means or buildings and for producing structural elements, in particular sandwich elements.

An important field of use of rigid polyurethane foams is composite elements. The production of composite elements composed of, in particular, metallic covering layers and a core of foams based on isocyanates, usually polyurethane (PUR) or polyisocyanurate (PIR) foams, frequently also referred to as sandwich elements, on continuously operating double belt plants is at present practiced on a large scale. Apart from sandwich elements for coolstore insulation, elements having colored covering layers are becoming ever more important for construction of façades of a variety of buildings. Apart from coated steel sheets, stainless steel sheets, copper sheets or aluminum sheets are used as covering layers.

It is important that the rigid polyurethane foams fill the hollow spaces uniformly and without voids, so that very good bonding to the covering layers gives a stable construction which ensures good thermal insulation. To prevent foam defects, the foamable PU reaction mixture has to be introduced within a short time into the hollow space to be insulated. Low-pressure or preferably high-pressure machines are usually used for filling such articles with foam.

A summary overview of the production of rigid polyurethane foams and their use as covering layer or core layer in composite elements and also their use as insulating layer in refrigeration or heating engineering may be found, for example, in "Polyurethane", Kunststoff-Handbuch, volume 7, 3rd edition 1993, edited by Dr. Günter Oertel, Carl-Hanser-Verlag, Munich/Vienna.

Suitable rigid polyurethane foams can be produced in a known manner by reacting organic polyisocyanates with one or more compounds having at least two reactive hydrogen atoms in the presence of blowing agents, catalysts and, if appropriate, auxiliaries and/or additives.

As compounds having at least two hydrogen atoms which are reactive toward isocyanate groups, preference is given to using polyether alcohols and/or polyester alcohols for producing the polyurethanes. The choice of polyols is made, in particular, on the basis of costs and the desired use properties (e.g. EP-A-1632511, U.S. Pat. No. 6,495,722, WO 2006/108833).

EP-A-728783 describes a process for producing rigid polyurethane foams by reacting organic polyisocyanates with a mixture of at least three different relatively high molecular weight polyether alcohols b1) to b3) of different functionality and an OH-comprising fatty acid ester b4) (from 8 to 20 parts by weight), in particular castor oil, in the presence of blowing agents and catalysts. The polyether alcohol b1) which is present in a proportion of from 20 to 60 parts by weight has functionalities of from 6 to 8 and average equivalent masses of from 125 to 200. Polyether alcohol b2) which is present in a proportion of from 5 to 30 parts by weight is based on aliphatic amines and has functionalities of from 3 to 4 and average equivalent masses of from 70 to 130. Polyether alcohol b3) which is present in a proportion of from 3 to 25 parts by weight has functionalities of from 2 to 3 and average equivalent masses of from 67 to 250. The polyol component preferably has an average hydroxyl number of from 350 to 390 mg KOH/g.

The surface properties of the known rigid polyurethane foams are still capable of improvement, especially in the production of composite elements since these properties have a substantial influence on the adhesion of the covering layers to the foam. In the production of foams by the spray foam process, too, a good surface is of great importance.

It is an object of the invention to develop a process for producing rigid polyurethane foams which leads to foams having improved adhesion and surface quality and whose polyol component has a low viscosity and thus good processing properties, in particular good flowability and curing.

The object has surprisingly been able to be achieved by a process for producing rigid polyurethane foams, in which a mixture of one or more high-functionality polyether alcohols having functionalities of from 3.5 to 5.5 and a hydroxyl number of from 350 to 550 mg KOH/g, one or more polyether alcohols based on aliphatic and/or aromatic amines and having functionalities of from 3 to 4 and a hydroxyl number of from 150 to 800 mg KOH/g, an OH-comprising fatty acid ester and, if appropriate, one or more low molecular weight chain extenders and/or crosslinkers having functionalities of from 2 to 3 and a molecular weight $M_w$ of <400 g/mol is used as polyol component.

The invention provides a process for producing rigid polyurethane foams by reacting a) organic polyisocyanates with b) compounds having at least two hydrogen atoms which are reactive toward isocyanate groups in the presence of c) blowing agents, d) catalysts and, if appropriate, e) auxiliaries and additives, wherein a mixture of b1) one or more high-functionality polyether alcohols having functionalities of from 3.5 to 5.5 and a hydroxyl number of from 350 to 550 mg KOH/g, b2) one or more polyether alcohols based on aliphatic and/or aromatic amines and having functionalities of from 3 to 4 and a hydroxyl number of from 150 to 800 mg KOH/g, b3) at least one OH-comprising fatty acid ester and, if appropriate, b4) one or more low molecular weight chain extenders and/or crosslinkers having functionalities of from 2 to 3 and a molecular weight $M_w$ of <400 g/mol is used as component b).

The polyol component b) can also comprise catalysts, stabilizers and customary auxiliaries and additives.

The invention further provides rigid polyurethane foams produced by the process of the invention.

In an particularly advantageous embodiment, the polyol component (b) comprises a mixture of b1) from 20 to 70 parts by weight, in particular from 20 to 60 parts by weight, of one or more high-functionality polyether alcohols having functionalities of from 3.5 to 5.5 and a hydroxyl number of from 350 to 550 mg KOH/g, b2) from 5 to 30 parts by weight, in particular from 5 to 25 parts by weight, of one or more polyether alcohols based on aliphatic and/or aromatic amines and having functionalities of from 3 to 4 and a hydroxyl number of from 150 to 800 mg KOH/g, b3) from 5 to 30 parts by weight, in particular from 5 to 20 parts by weight, of an OH-comprising fatty acid ester and, if appropriate, b4) from 1 to 20 parts by weight, in particular from 2 to 10 parts by weight, of one or more low molecular weight chain extenders and/or crosslinkers having functionalities of from 2 to 3 and a molecular weight $M_w$ of <400 g/mol.

As ester of glycerol and OH-comprising fatty acids b3), particular preference is given to using castor oil.

The polyol component b) used according to the invention preferably has an average hydroxyl number of from 300 to 600 mg KOH/g, in particular from 400 to 550 mg KOH/g.

The hydroxyl number is determined in accordance with DIN 53240.

As regards the individual components used in the process of the invention, the following may be said:

a) Possible organic polyisocyanates are the aliphatic, cycloaliphatic, araliphatic and preferably aromatic polyfunctional isocyanates known per se.

Specific examples are: alkylene diisocyanates having from 4 to 12 carbon atoms in the alkylene radical, e.g. dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, e.g. cyclohexane 1,3- and 1,4-diisocyanate and also any mixtures of these isomers, 1-isocyanato-3,3,5-trimethyl-5-isocyanatomethylcyclohexane (isophorone diisocyanate), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, and preferably aromatic diisocyanates and polyisocyanates, e.g. tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,4'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates. The organic diisocyanates and polyisocyanates can be used individually or in the form of their mixtures.

Use is frequently also made of modified polyfunctional isocyanates, i.e. products which are obtained by chemical reaction of organic diisocyanates and/or polyisocyanates. Mention may be made by way of example of diisocyanates and/or polyisocyanates comprising ester, urea, biuret, allophanate, carbodiimide, isocyanurate, uretdione and/or urethane groups.

Specific examples are: organic, preferably aromatic polyisocyanates comprising urethane groups and having NCO contents of from 33.6 to 15% by weight, preferably from 31 to 21% by weight, based on the total weight, for example reaction products of low molecular weight diols, triols, dialkylene glycols, trialkylene glycols or polyoxyalkylene glycols, and having molecular weights up to 6000, in particular molecular weights up to 1500, modified diphenylmethane 4,4'-diisocyanate, modified diphenylmethane 4,4'- and 2,4'-diisocyanate mixtures or modified crude MDI or tolylene 2,4- or 2,6-diisocyanate, with examples of dialkylene glycols or polyoxyalkylene glycols, which can be used individually or as mixtures, being: diethylene glycol, dipropylene glycol, polyoxyethylene, polyoxypropylene and polyoxypropylene-polyoxyethylene glycols, triols and/or tetrols. Also suitable are prepolymers comprising NCO groups and having NCO contents of from 25 to 3.5% by weight, preferably from 21 to 14% by weight, based on the total weight, and prepared from the polyester polyols and/or preferably polyether polyols described below and diphenylmethane 4,4'-diisocyanate, mixtures of diphenylmethane 2,4'- and 4,4'-diisocyanate, tolylene 2,4- and/or 2,6-diisocyanates or crude MDI.

Liquid polyisocyanates comprising carbodiimide groups and/or isocyanurate rings and having NCO contents of from 33.6 to 15% by weight, preferably from 31 to 21% by weight, based on the total weight, e.g. compounds based on diphenylmethane 4,4'-, 2,4'- and/or 2,2'-diisocyanate and/or tolylene 2,4- and/or 2,6-diisocyanate, have also been found to be useful.

The modified polyisocyanates can, if appropriate, be mixed with one another or with unmodified organic polyisocyanates such as diphenylmethane 2,4'-, 4,4'-diisocyanate, crude MDI, tolylene 2,4- and/or 2,6-diisocyanate.

Organic polyisocyanates which have been found to be particularly useful and are therefore preferably employed are: mixtures of tolylene diisocyanates and crude MDI or mixtures of modified organic polyisocyanates comprising urethane groups and having an NCO content of from 33.6 to 15% by weight, in particular ones based on tolylene diisocyanates, diphenylmethane 4,4'-diisocyanate, diphenylmethane diisocyanate isomer mixtures or crude MDI and in particular crude MDI having a diphenylmethane diisocyanate isomer content of from 25 to 80% by weight, preferably from 30 to 55% by weight.

b) The polyether polyols b1) and b2) used are prepared by known methods, for example from one or more alkylene oxides having from 2 to 4 carbon atoms in the alkylene radical by anionic polymerization using alkali metal hydroxides such as sodium or potassium hydroxide or alkali metal alkoxides such as sodium methoxide, sodium or potassium ethoxide or potassium isopropoxide as catalysts with addition of at least one starter molecule comprising from 2 to 8, preferably from 2 to 6, reactive hydrogen atoms in bound form or by cationic polymerization using Lewis acids such as antimony pentachloride, boron fluoride etherate, etc. or bleaching earth as catalysts. It is also possible to use multimetal cyanide compounds, known as DMC catalysts. Tertiary amines such as triethylamine, tributylamine, trimethylamine, dimethylethanolamine and/or dimethylcyclohexylamine can also be used as catalyst.

Suitable alkylene oxides for preparing the polyether polyols b1) and b2) are, for example, ethylene oxide, 1,2-propylene oxide, 1,3-propylene oxide, 1,2- or 2,3-butylene oxide, tetrahydrofuran, styrene oxide, preferably ethylene oxide and 1,2-propylene oxide. The alkylene oxides can be used individually, alternately in succession or as mixtures.

Possible starter molecules for the polyether alcohols used according to the invention are the following compounds:

b1) Use is made, in particular, of hydroxyl-comprising high-functionality compounds, in particular sugars, starches or lignin, as starter substances. Glucose, sucrose and sorbitol are of particular practical importance here. Since these compounds are present in solid form under the usual reaction conditions of alkoxylation, it is generally customary to alkoxylate these compounds together with coinitiators. Suitable coinitiators are, in particular, water and polyfunctional lower alcohols, e.g. glycerol, trimethylolpropane, pentaerythritol, ethylene glycol, propylene glycol and homologues thereof.

b2) As starter molecules having at least two primary amino groups in the molecule, preference is given to using aromatic diamines and/or polyamines, for example phenylenediamines, 2,3-, 2,4-, 3,4- and 2,6-tolylenediamine (TDA) and 4,4'-, 2,4'- and 2,2'-diaminodiphenylmethane.

Aliphatic starter molecules used are, in particular, ammonia, polyfunctional aliphatic amines, in particular those having from 2 to 6 carbon atoms and primary and secondary amino groups, and also amino alcohols having from 2 to 6 carbon atoms in the main chain. Preference is given to using ethylenediamine, monoalkylethylenediamines, 1,3-propylenediamine and also various butylenediamines and hexamethylenediamines; and ethanolamine, diethanolamine and triethanolamine as amino alcohols.

The polyether alcohols b1) preferably have functionalities of from 3.7 to 5.2 and a hydroxyl number of 370-500 mg KOH/g.

Polyether alcohols b2) based on aromatic or aromatic and aliphatic amines are preferred. Very particular preference is given to polyether alcohols b2) based on aromatic amines and having functionalities of from 3 to 4 and a hydroxyl number of from 150 to 500 mg KOH/g.

Further information regarding the polyether alcohols b1) and b2) used and also their preparation may be found, for example, in Kunststoffhandbuch, volume 7 "Polyurethane", edited by Günter Oertel, Carl-Hanser-Verlag, Munich, 3rd edition, 1993.

The polyol component b) can advantageously be prepared with concomitant use of low molecular weight chain extenders and/or crosslinkers b4). As chain extenders and/or crosslinkers b4), use is made of diols and/or triols and also amino alcohols having molecular weights of less than 400, preferably from 60 to 300.

Possibilities are, for example, aliphatic, cycloaliphatic and/or araliphatic diols having from 2 to 14 carbon atoms, preferably from 2 to 10 carbon atoms, e.g. ethylene glycol, 1,2-propylene glycol, 1,3-propanediol, 1,10-decanediol, o-, m-, p-dihydroxy-cyclohexane, diethylene glycol, dipropylene glycol, 1,4-butanediol, 1,6-hexanediol and bis(2-hydroxyethyl)hydroquinone, triols such as 1,2,4-, 1,3,5-trihydroxy-cyclohexane, glycerol and trimethylolpropane and low molecular weight hydroxyl-comprising polyalkylene oxides based on ethylene oxide and/or 1,2-propylene oxide and the abovementioned diols and/or triols as starter molecules and also amino alcohols such as diethanolamine and triethanolamine.

The use an aliphatic diol having 2-6 carbon atoms, in particular 1,2-propylene glycol, as chain extender b4) is particularly preferred.

If the abovementioned low molecular weight chain extenders, crosslinkers or mixtures thereof are employed for preparing the polyol component b), they are advantageously used in an amount of from 1 to 20% by weight, preferably from 2 to 10% by weight, based on the weight of the polyol compound (b).

c) As blowing agent for the process of the invention, it is possible to use the blowing agents customary for producing rigid polyurethane foams.

As blowing agents c), it is possible to use water and additionally generally known chemically and/or physically acting compounds. For the purposes of the present invention, chemical blowing agents are compounds which react with isocyanate to form gaseous products, for example water or formic acid. Physical blowing agents are compounds which are dissolved or emulsified in the starting materials for polyurethane production and vaporize under the conditions of polyurethane formation. These are, for example, hydrocarbons, halogenated hydrocarbons and other compounds, for example perfluorinated alkanes such as perfluorohexane, chlorofluorocarbons, and ethers, esters, ketones, acetals and also inorganic and organic compounds which liberate nitrogen on heating, or mixtures thereof, for example (cyclo)aliphatic hydrocarbons having from 4 to 8 carbon atoms or fluorinated hydrocarbons such as 1,1,1,3,3-pentafluoropropane (HFC 245 fa), trifluoromethane, difluoromethane, 1,1,1,3,3-pentafluorobutane (HFC 365 mfc), 1,1,1,2-tetrafluoroethane, difluoroethane and hepta-fluoropropane.

Low-boiling aliphatic hydrocarbons, preferably n-pentane and/or isopentane, in particular n-pentane, are advantageously used as blowing agents.

n-Pentane has a boiling point of 36° C., isopentane a boiling point of 28° C. The boiling points are therefore in a range which is favorable for the blowing process.

Since the aliphatic hydrocarbons which are suitable as blowing agents are flammable and explosive, the foaming plants have to be equipped with the appropriate safety devices as are also necessary when using cyclopentane as blowing agent.

It is advantageous to use the aliphatic hydrocarbons together with water as blowing agent. The amount of aliphatic hydrocarbons used is from 2 to 25% by weight, preferably from 5 to 15% by weight, based on the component b). The proportion of water depends on the desired foam density of the rigid polyurethane foam.

d) Catalysts (d) used for producing the rigid polyurethane foams are, in particular, compounds which strongly accelerate the reaction of the compounds comprising reactive hydrogen atoms, in particular hydroxyl groups, of the component (b) with the organic, modified or unmodified polyisocyanates (a).

Suitable catalysts (d) are strongly basic amines, for example amidines such as 2,3-dimethyl-3,4,5,6-tetrahydropyrimidine, tertiary amines such as triethylamine, tributylamine, dimethylcyclohexylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethyl-1,6-hexanediamine, pentamethyldiethylenetriamine, tetramethyldiamino(ethyl ether), bis(2-dimethyl-aminoethyl)ether, bis(dimethylaminopropyl)urea, dimethylpiperazine, 1,2-dimethyl-imidazole, 1-azabicyclo[3.3.0]octane and preferably 1,4-diazabicyclo[2.2.2]octane, and alkanolamine compounds such as triethanolamine, triisopropanolamine, N-methyldiethanolamine and N-ethyldiethanolamine, N,N-dimethylaminoethoxyethanol, N,N,N'-trimethylaminoethylethanolamine and dimethylethanolamine.

Further possible catalysts are: tris(dialkylaminoalkyl)-s-hexahydrotriazines, in particular tris(N,N-dimethylaminopropyl)-s-hexahydrotriazine, tetraalkylammonium hydroxides such as tetramethylammonium hydroxide, alkali metal hydroxides such as sodium hydroxide and alkali metal alkoxides such as sodium methoxide and potassium isopropoxide and also alkali metal salts of long-chain fatty acids having from 10 to 20 carbon atoms and possibly lateral OH groups.

If isocyanurate groups are to be incorporated into the rigid foam, specific catalysts are required. As isocyanurate catalysts, use is usually made of metal carboxylates, in particular potassium acetate and solutions thereof. The catalysts can, depending on requirements, be used either alone or in any mixtures with one another.

Preference is given to using from 0.001 to 7% by weight, in particular from 0.05 to 5% by weight, of catalyst or catalyst combination, based on the weight of the component (b).

e) If appropriate, auxiliaries and/or additives (e) can be incorporated into the reaction mixture for producing the rigid polyurethane foams. Mention may be made by way of example of surface-active substances, foam stabilizers, cell regulators, fillers, dyes, pigments, flame retardants, hydrolysis inhibitors, fungistatic and bacteriostatic substances.

Possible surface-active substances are, for example, compounds which serve to aid the homogenization of the starting materials and may also be suitable for regulating the cell structure of the plastics. Mention may be made by way of example of emulsifiers such as the sodium salts of castor oil sulfates or of fatty acids and also salts of fatty acids with amines, e.g. diethylamine oleate, diethanolamine stearate, diethanolamine ricinoleate, salts of sulfonic acids, e.g. alkali metal or ammonium salts of dodecylbenzenesulfonic acid or dinaphthylmethanedisulfonic acid and ricinoleic acid; foam stabilizers such as siloxane-oxyalkylene copolymers and other organo-polysiloxanes, ethoxylated alkylphenols, ethoxylated fatty alcohols, paraffin oils, castor oil esters and ricinoleic esters, Turkey red oil and peanut oil and cell regulators such as paraffins, fatty alcohols and dimethylpolysiloxanes. The above-described oligomeric acrylates having polyoxyalkylene and fluoroalkane radicals as side groups are also suitable for improving the emulsifying action, the cell structure and/or for stabilizing the foam. The surface-active substances are usually employed in amounts of from 0.01 to 5 parts by weight, based on 100 parts by weight of the component (b).

For the purposes of the present invention, fillers, in particular reinforcing fillers, are the customary organic and inorganic fillers, reinforcing materials, weighting agents, agents for improving the abrasion behavior in paints, coating compositions, etc., known per se. Specific examples are: inorganic fillers such as siliceous minerals, for example sheet silicates such as antigorite, serpentine, horn blendes, amphiboles, chrysotile, talc; metal oxides such as kaolin, aluminum oxides, titanium oxides and iron oxides, metal salts such as chalk, barite and inorganic pigments such as cadmium sulfide, zinc sulfide and also glass, etc. Preference is given to using kaolin (china clay), aluminum silicate and coprecipitates of barium sulfate and aluminum silicate and also natural and synthetic fibrous minerals such as wollastonite, metal fibers and in particular glass fibers of various lengths which may be coated with a size. Possible organic fillers are, for example: carbon, melamine, rosin, cyclopentadienyl resins and graft polymers and also cellulose fibers, polyamide, polyacrylonitrile, polyurethane, polyester fibers based on aromatic and/or aliphatic dicarboxylic esters and in particular carbon fibers.

The inorganic and organic fillers can be used individually or as mixtures and are advantageously incorporated into the reaction mixture in amounts of from 0.5 to 50% by weight, preferably from 1 to 40% by weight, based on the weight of the components (a) and (b), but the content of mats, nonwovens and woven fabrics of natural and synthetic fibers can reach values of up to 80% by weight.

As flame retardants, it is possible to employ organic phosphoric esters and/or phosphonic esters. Preference is given to using compounds which are not reactive toward isocyanate groups. Chlorine-comprising phosphoric esters are also among the preferred compounds. Suitable flame retardants are, for example, tris(2-chloropropyl)phosphate, triethyl phosphate, diphenyl cresyl phosphate, diethyl ethanephosphinate, tricresyl phosphate, tris(2-chloroethyl)phosphate, tris(1,3-dichloropropyl)phosphate, tris(2,3-dibromopropyl) phosphate, tetrakis(2-chloroethyl)ethylene diphosphate, dimethyl methanephosphonate, diethyl diethanolaminomethylphosphonate and also commercial halogen-comprising flame retardant polyols.

In addition, it is also possible to use bromine-comprising flame retardants. As bromine-comprising flame retardants, preference is given to using compounds which are reactive toward the isocyanate group. Such compounds are, for example, esters of tetrabromophthalic acid with aliphatic diols and alkoxylation products of dibromobutenediol. Compounds derived from the group of brominated neopentyl compounds comprising OH groups can also be employed.

Apart from the abovementioned halogen-substituted phosphates, it is also possible to use inorganic or organic flame retardants such as red phosphorus, aluminum oxide hydrate, antimony trioxide, arsenic oxide, ammonium polyphosphate and calcium sulfate, expandable graphite or cyanuric acid derivatives such as melamine, or mixtures of at least two flame retardants such as ammonium polyphosphates and melamine and, if appropriate, maize starch or ammonium polyphosphate, melamine and expandable graphite and/or aromatic or nonaromatic polyesters for making the polyisocyanate polyaddition products flame resistant. In general, it has been found to be advantageous to use from 5 to 50 parts by weight, preferably from 5 to 25 parts by weight, of the flame retardants mentioned per 100 parts by weight of the component (b).

Further details regarding the abovementioned other customary auxiliaries and additives may be found in the specialist literature, for example the monograph by J. H. Saunders and K. C. Frisch "High Polymers", volume XVI, Polyurethanes, parts 1 and 2, Interscience Publishers 1962 and 1964, or Kunststoff-Handbuch, Polyurethane, volume VII, Hanser-Verlag, Munich, Vienna, 3rd edition, 1993.

To produce the rigid polyurethane foams, the polyisocyanates a) and the polyol component b) are reacted in such amounts that the isocyanate index is in the range from 100 to 150, preferably from 105 to 140, and particularly preferably from 110 to 130. The isocyanate index is the molar ratio of isocyanate groups to groups which are reactive toward isocyanate groups, multiplied by 100.

The rigid foams of the invention are preferably produced on continuously operating double belt plants. Here, the polyol component and the isocyanate component are metered by means of a high-pressure machine and mixed in a mixing head. Catalysts and/or blowing agents can be added to the polyol mixture beforehand by means of separate pumps. The reaction mixture is applied continuously to the lower covering layer. The lower covering layer with the reaction mixture and the upper covering layer run into the double belt. Here, the reaction mixture foams and cures. After leaving the double belt, the continuous strip is cut into the desired dimensions. In this way, it is possible to produce sandwich elements having metallic covering layers or insulation elements having flexible covering layers.

The starting components are mixed at a temperature of from 15 to 90° C., preferably from 20 to 60° C., in particular from 20 to 45° C. The reaction mixture can be cast into closed support tools by means of high- or low-pressure metering machines. Discontinuous sandwich elements, for example, are manufactured by this technology.

The rigid polyurethane foams produced by the process of the invention have a density of from 0.02 to 0.75 g/cm$^3$, preferably from 0.025 to 0.24 g/cm$^3$ and in particular from 0.03 to 0.1 g/cm$^3$. They are particularly suitable as insulation material in the building and refrigeration sector, e.g. as intermediate layer for sandwich elements or for filling housings of refrigerators and freezer chests with foam.

The rigid PUR foams produced by the process of the invention have good surfaces with few defects and display good curing. The use of the OH-comprising fatty acid ester b3) and the low molecular weight chain extender and/or crosslinker b4) enables the viscosity of the polyol component b) to be reduced. The low viscosity of the polyol component b) simplifies processing on the double belt plant.

The invention is illustrated by the examples below.

The rigid foams were produced on a double belt plant set to a temperature of 40° C.

COMPARATIVE EXAMPLE

A polyol component was produced by mixing
71.5 parts by weight of a polyether alcohol having a hydroxyl number of 490 mg KOH/g and based on propylene oxide and a mixture of sucrose and glycerol as starter,
15 parts by weight of a polyether alcohol having a hydroxyl number of 390 mg KOH/g and based on ethylene oxide/propylene oxide and vicinal TDA as starter,
10 parts by weight of tris-2-chloroisopropyl phosphate,
2 parts by weight of Tegostab® B8496 from Goldschmidt,
0.5 part by weight of potassium acetate in ethylene glycol, 50% strength solution, and
1 part by weight of water.

This was reacted with a polymeric MDI having an NCO content of 31.5% by weight (Lupranat® M50 from BASF SE) in the presence of n-pentane (7.5 parts by weight), dimethylcyclohexylamine and water at an isocyanate index of 120. The amounts of dimethylcyclohexylamine and water were selected so that the gel time was 45 seconds and the resulting foam had a density of 36 g/l.

Example 1

A polyol component was produced by mixing
46.5 parts by weight of a polyether alcohol having a hydroxyl number of 490 mg KOH/g and based on propylene oxide and a mixture of sucrose and glycerol as starter,
15 parts by weight of a polyether alcohol having a hydroxyl number of 390 mg KOH/g and based on ethylene oxide/propylene oxide and vicinal TDA as starter,
10 parts by weight of tris-2-chloroisopropyl phosphate,
25 parts by weight of castor oil,
2 parts by weight of Tegostab® B8496 from Goldschmidt,
0.5 part by weight of potassium acetate in ethylene glycol, 50% strength solution, and
1 part by weight of water.

This was reacted with a polymeric MDI having an NCO content of 31.5% by weight (Lupranat® M50 from BASF SE) in the presence of n-pentane (7.5 parts by weight), dimethylcyclohexylamine and water at an isocyanate index of 120. The amounts of dimethylcyclohexylamine and water were selected so that the gel time was 45 seconds and the resulting foam had a density of 36 g/l.

Example 2

A polyol component was produced by mixing
38.5 parts by weight of a polyether alcohol having a hydroxyl number of 490 mg KOH/g and based on propylene oxide and a mixture of sucrose and glycerol as starter,
15 parts by weight of a polyether alcohol having a hydroxyl number of 390 mg KOH/g and based on ethylene oxide/propylene oxide and vicinal TDA as starter,
10 parts by weight of tris-2-chloroisopropyl phosphate,
25 parts by weight of castor oil,
8 parts by weight of 1,2-propylene glycol,
2 parts by weight of Tegostab® B8496 from Goldschmidt,
0.5 part by weight of potassium acetate in ethylene glycol, 50% strength solution, and
1 part by weight of water.

This was reacted with a polymeric MDI having an NCO content of 31.5% by weight (Lupranat® M50 from BASF SE) in the presence of n-pentane (7.5 parts by weight), dimethylcyclohexylamine and water at an isocyanate index of 120. The amounts of dimethylcyclohexylamine and water were selected so that the gel time was 45 seconds and the resulting foam had a density of 36 g/l.

Curing was determined by means of the indenter test. For this purpose, a steel indenter having a hemispherical end having a radius of 10 mm was pressed to a depth of 10 mm into the foam formed by means of a tensile/compressive testing machine at 3, 4, 5 and 6 minutes after mixing of the components in a polystyrene cup. The maximum force required in N is a measure of the curing of the foam. The measured maximum forces after 3, 4, 5 and 6 minutes and the sum of curing after 3, 4, 5 and 6 minutes are reported in each case.

For the adhesion experiments, sandwich elements (200× 200×80 mm) having metallic covering layers were foamed in the laboratory in a closed heated mold. The temperature of the mold was 40° C. and the total density of the foam was 36 g/l. After curing of the system, test specimens having dimensions of 100×100×80 mm were sawn and the adhesion of the foam to the covering layer was determined in accordance with DIN EN ISO 527-1/DIN 53292.

The frequency of surface defects was determined quantitatively by an optical method. For this purpose, a foam specimen was cut down to a plane one millimeter from the lower covering layer, i.e. the covering layer to which the polyurethane reaction solution had been applied in the double belt process.

In the quantitative assessment of the surface, the surface of the foam was illuminated from the right and then from the left and in each case photographed. The images were superimposed and analyzed by means of image analysis software. The defects on the surface appear as black areas. The percentage of the black areas based on the total surface area is a measure of the frequency of surface defects in the foam.

Furthermore, an additional qualitative assessment of the nature of the surface of the foams was carried out by removing the covering layer from a 1 m×2 m foam specimen and visually assessing the surface.

The results are shown in Table 1:

TABLE 1

| | Comparative example | Example 1 | Example 2 |
|---|---|---|---|
| Curing after 3 min [N] | 72 | 62 | 68 |
| Curing after 4 min [N] | 78 | 75 | 80 |
| Curing after 5 min [N] | 85 | 83 | 91 |
| Curing after 6 min [N] | 91 | 91 | 98 |
| Sum of curing after 3-6 min [N] | 326 | 311 | 337 |
| Tensile strength [N/mm²] | 0.25 | 0.28 | 0.34 |
| Surface (qualitative) | poor | good | very good |
| Surface (quantitative) [%] | 5.5 | 1.7 | 0.9 |
| Viscosity of polyol component at 20° C. [mPas] | 8370 | 3750 | 1920 |

The results in table 1 show that the surface properties of the foams and the adhesion have been significantly improved by the process of the invention. Furthermore, the viscosity of the polyol component is reduced considerably, so that processing, determined by the good flowability and the likewise satisfactory curing, is simplified.

The invention claimed is:
1. A process for producing a rigid polyurethane foam, the process comprising reacting
   (a) at least one organic polyisocyanate with
   (b) at least one compound comprising at least two hydrogen atoms which are reactive an toward isocyanate group in the presence of

(c) at least one blowing agent,
(d) at least one catalyst and,
(e) optionally, at least one selected from a group consisting of an auxiliary and an additive,
wherein (b) comprises a mixture, having an average hydroxyl number of from 400 to 550 mg KOH/g, and comprising:
from 20 to 70 parts by weight of (b1) at least one high-functionality polyether alcohol, prepared from hydroxyl-comprising high-functionality starter molecules, and having a functionality of from 3.7 to 5.2 and a hydroxyl number of from 370 to 500 mg KOH/g;
from 5 to 30 parts by weight of (b2) at least one polyether alcohol based on at least one aromatic amine and having functionalities of from 3 to 4 and a hydroxyl number of from 260 to 500 mg KOH/g;
from 5 to 20 parts by weight of (b3) at least one OH-comprising fatty acid ester; and
from 1 to 20 parts by weight of (b4) at least one selected from the group consisting of a low molecular weight chain extender and a crosslinker, having a functionality of from 2 to 3 and a molecular weight Mw of <400 g/mol;
and where (b1) and (b2) are the only types of polyether alcohols used in said process.

2. The process of claim 1, wherein from 2 to 10 parts by weight of the at least one selected from the group consisting of a low molecular weight chain extender and a crosslinker are present in (b4).

3. The process of claim 1, wherein castor oil is present as said at least one OH-comprising fatty acid ester.

4. The process of claim 1, wherein (b4) is a low molecular weight chain extender which comprises 1,2-propylene glycol.

5. The process of claim 1, wherein the reacting is carried out at an isocyanate index of from 100 to 150.

6. The process of claim 1, wherein said at least one blowing agent comprises at least one selected from the group consisting of n-pentane and isopentane.

7. A rigid polyurethane foam, produced by the process of claim 1.

8. The process of 2, wherein castor oil is present as said at least one OH-comprising fatty acid ester.

9. The process of claim 2, wherein (b4) is a low molecular weight chain extender which comprises 1,2-propylene glycol.

10. The process of claim 3, wherein (b4) is a low molecular weight chain extender which comprises 1,2-propylene glycol.

11. The process of claim 2, wherein the reacting is carried out at an isocyanate index of from 100 to 150.

12. The process of claim 3, wherein the reacting is carried out at an isocyanate index of from 100 to 150.

13. The process of claim 4, wherein the reacting is carried out at an isocyanate index of from 100 to 150.

14. The process of claim 2, wherein said at least one blowing agent comprises at least one selected from the group consisting of n-pentane and isopentane.

15. The process of claim 3, wherein said at least one blowing agent comprises at least one selected from the group consisting of n-pentane and isopentane.

16. The process of claim 4, wherein said at least one blowing agent comprises at least one selected from the group consisting of n-pentane and isopentane.

17. The process of claim 5, wherein said at least one blowing agent comprises at least one selected from the group consisting of n-pentane and isopentane.

* * * * *